UNITED STATES PATENT OFFICE.

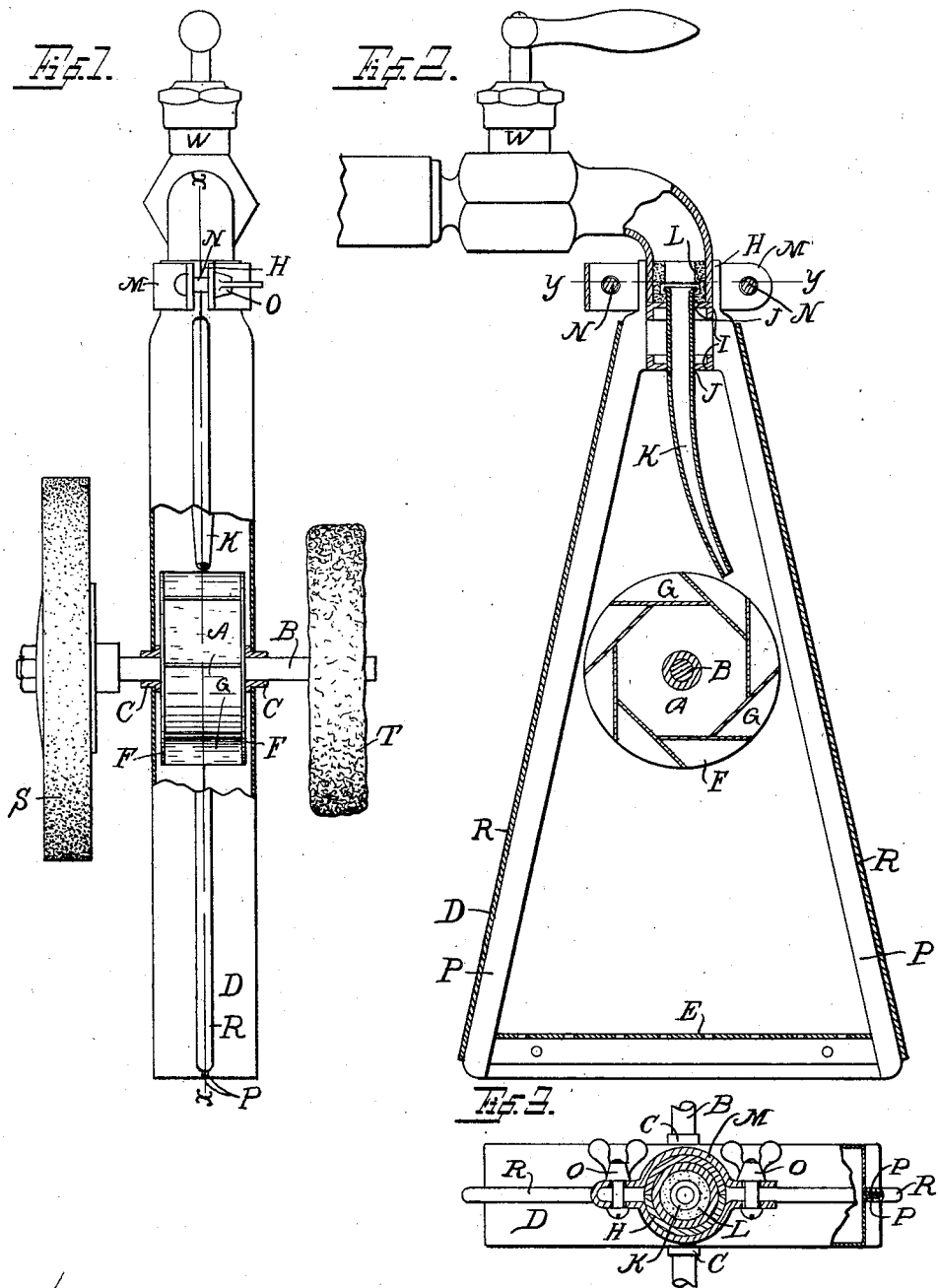

NICOLAUS SCHMIDT, OF MILWAUKEE, WISCONSIN.

WATER-MOTOR.

SPECIFICATION forming part of Letters Patent No. 697,547, dated April 15, 1902.

Application filed June 22, 1901. Serial No. 65,551. (No model.)

*To all whom it may concern:*

Be it known that I, NICOLAUS SCHMIDT, a citizen of the United States, residing at Milwaukee, county of Milwaukee, and State of Wisconsin, have invented new and useful Improvements in Water-Motors, of which the following is a specification.

The object of my invention is to provide an inexpensive and efficient water-motor adapted to be quickly and easily attached to an ordinary kitchen-faucet and driven by city water-pressure, the same being especially adapted to be used for driving a small emery-wheel, a buffer, or rotary polishing-brushes, and other similar implements for domestic purposes.

My invention pertains to the construction of the motor-wheel, the inclosing case, and means for securing the case to a faucet, and the same is further explained by reference to the accompanying drawings, in which—

Figure 1 represents a side view. Fig. 2 represents a vertical section drawn on line $x\,x$ of Fig. 1, and Fig. 3 represents a horizontal section drawn on line $y\,y$ of Fig. 2.

Like parts are identified by the same reference-letter throughout the several views.

A is a motor-wheel.

B is a wheel-supporting shaft. The shaft B has journal-bearings C C in the respective sides of the case D. The lower end of the case D is inclosed with a perforated plate E, the object of which is to prevent the water from spattering as it is discharged from the case.

The wheel A consists of two vertical side plates F F and an annular series of buckets G, which are secured at their sides to the inner walls of the respective plates F, as shown in Fig. 1 and Fig. 2.

The coupling for connecting the case D with the faucet W consists of the elastic connecting-sleeve H, which is attached to or formed integrally with the case D, horizontal partition I, provided with a central aperture J for the reception of the discharge-nozzle K, which is secured therein, elastic collar L, and clamping-bracket M. The respective sides of the clamping bracket or band M are secured together by the clamping-bolts N N and clamping-nuts O O. The clamping bracket or band M is preferably formed of a single piece, as indicated in Fig. 3, the respective sides of which are drawn toward each other and clamped around the sleeve H when securing the same to a faucet by turning down the hand-nuts O. It will be understood that by this construction the rubber sleeve L will when water is turned on be expanded by water-pressure against the inner walls of the faucet, and thereby a tight joint will be formed, which will prevent the water from escaping through such connections.

To facilitate in opening the case D as may be desired to reach or repair the wheel, the respective sides are provided with outwardly-projecting flanges P P, which are held together by the U-shaped clamping-pieces R R, as shown in Fig. 3.

S represents an emery-wheel, and T a rotary brush, which are secured to the shaft B in the ordinary manner.

It will of course be understood that a pulley or band-wheel may, if desired, be substituted for the brush or emery-wheel for driving light machinery and also that said motor is controlled entirely by opening and closing the faucet W.

Having thus described my invention, what I claim as new, and desire to secure by Letters Patent, is—

1. A water-motor, comprising a motor-wheel; an inclosing case; a wheel-supporting shaft having journal-bearings in the walls of said case; a discharge-nozzle having its discharge end in close proximity to the buckets of said wheel; a coupling, comprising an exterior elastic sleeve adapted to be clamped to the exterior walls of the faucet; an interior elastic sleeve, or packing, adapted to be forced outwardly by the water-pressure, against the interior wall of said faucet; and an elastic clamping-band for clamping said exterior sleeve to the faucet, as set forth.

2. The combination of a motor-wheel A; an inclosing case comprising two separable parts, provided with outwardly-projecting flanges P, and clamping-pieces R fitted to said clamping-flanges; a wheel-supporting shaft B having journal-bearings in the walls of said case; a perforated bottom piece E, inclosing the lower end of said case; a discharge-nozzle K; and means for connecting said case to the faucet, substantially as set forth.

3. In a water-motor, the combination with a water-wheel A, comprising two side plates F, F, and an annular series of buckets G, secured at their sides to said vertical plates; a supporting-shaft B; and inclosing case D, said shaft B having journal-bearings in the walls of said case; a discharge-nozzle K; means for suspending said case from a faucet, comprising a flexible metallic collar H secured to the exterior wall of the faucet; an interior rubber collar L, having bearings against the interior wall of the faucet; a flexible clamping-band M; and means for securing said clamping-band around said collar, substantially as and for the purpose specified.

In testimony whereof I affix my signature in the presence of two witnesses.

NICOLAUS SCHMIDT.

Witnesses:
JAS. B. ERWIN,
C. L. ROESCH.